United States Patent [19]

Kawamura et al.

[11] Patent Number: 4,744,747
[45] Date of Patent: May 17, 1988

[54] HEATER CONTROLLER

[75] Inventors: Hideo Kawamura, Kanagawa; Keiichi Yamashita; Yukio Yoshida, both of Yokohama, all of Japan

[73] Assignee: Isuzu Motors Limited, Tokyo, Japan

[21] Appl. No.: 945,865

[22] Filed: Dec. 23, 1986

[30] Foreign Application Priority Data

Dec. 23, 1985 [JP] Japan .................................. 60-290123

[51] Int. Cl.⁴ .............................................. F23N 1/00
[52] U.S. Cl. ....................................... 431/36; 431/75;
431/259; 237/2 A; 237/12.3 C; 123/551
[58] Field of Search ............... 431/28, 36, 41, 78,
431/208, 258, 259, 75; 126/350 A; 237/12.3 C,
2 A; 123/550, 551

[56] References Cited

U.S. PATENT DOCUMENTS

| 3,236,453 | 2/1966 | Raymond | 126/350 A X |
| 3,501,257 | 3/1970 | Hilton et al. | 431/208 X |
| 4,192,457 | 3/1980 | Easterly | 237/12.3 C |
| 4,625,910 | 12/1986 | Kawamura | 237/12.3 C X |

FOREIGN PATENT DOCUMENTS 618650  8/1935  Fed. Rep. of Germany ........ 431/28

Primary Examiner—Margaret A. Focarino
Attorney, Agent, or Firm—Staas & Halsey

[57] ABSTRACT

A controller for a heater has two switch circuits for controlling the supply of electric power to an atomizing glow plug for atomizing fuel and an ignition glow plug for igniting atomized fuel, the glow plugs being connected parallel to each other. One of the switch circuits includes a series-connected resistor for producing a voltage drop thereacross. During an inital period of operation of the heater, the first switch circuit free of the series-connected resistor is turned on to heat the glow plugs quickly up to respective prescribed temperatures for atomizing and igniting the fuel. Upon elapse of a predetermined period of time, during which the prescribed temperatures are reached, the first switch circuit is turned off and the second switch circuit with the series-connected resistor is turned on to keep the glow plugs at the prescribed temperatures without further heating them.

5 Claims, 2 Drawing Sheets

HEATER CONTROLLER

BACKGROUND OF THE INVENTION

1. Field of the Invention

The present invention relates to a controller for controlling a heater which heats the interior of an automotive passenger compartment or the like.

2. Description of the Related Art

Conventional automotive passenger compartments are heated by introducing a coolant from the internal combustion engine via a coolant pipe into a heater assembly composed of a heater core and a blower, and passing air through the heater assembly so that the air heated by the heater core through heat exchange can be used for heating purpose.

The above arrangement utilizing an engine coolant is however disadvantageous for the following reasons: Since it takes more than 10 minutes for a gasoline engine or more than 20 minutes for a diesel engine to be warmed up, the coolant is not available for heating the compartment during that time interval. Therefore, especially in colder climates, passengers are required to wear clothes designed for cold weather protection in the compartment during such a warm-up interval. Further, the defroster for removing frost or ice from the window glass sheets does not work well until the temperature of the coolant is high enough.

Another problem with the conventional heaters is that when the automobile is running down a long downward slope, the coolant temperature may fall to the extent that the coolant is no longer effective in heating the compartment. Since a diesel engine, in particular, is of the type in which an air-fuel mixture is compressed in each engine cylinder and ignited by the heat produced by the compression of the air-fuel mixture under high pressure, the temperature of the exhaust gas and the coolant temperature are highly apt to decrease upon travel down a downward slope because only a light load is imposed on the engine on the downward slope. Furthermore, the diesel engine tends to produce white smoke and odor due to incomplete fuel combustion under cold conditions.

To eliminate the above drawbacks, the applicant has filed Japanese Patent Application No. 59-106869 for an automotive heater in which a burner is provided in the air intake pipe of an engine and a heat exchanger is disposed downstream of the burner, so that heat produced by burning fuel in the burner will be recovered by the heat exchanger as a heat source.

A control device for controlling the temperatures of an atomizing glow plug in a fuel atomizer of the burner and an igniting glow plug for igniting atomized fuel has respective bridges for the glow plugs, making a control mechanism somewhat complex.

SUMMARY OF THE INVENTION

It is an object of the present invention to provide a controller for controlling a heater, which has a simple control mechanism for controlling the supply of electric power to an atomizing glow plug in a fuel atomizer of a burner of the heater and an igniting glow plug for igniting atomized fuel, so that heated air can be obtained immediately after the heater is started.

According to the present invention, a controller for controlling a heater including a burner having an atomizing flow plug for heating and atomizing fuel and an igniting glow plug for igniting the fuel which has been heated and atomized by the atomizing glow plug, the controller comprising a first switch for supplying electric power to the atomizing glow plug and the igniting glow plug which are connected in parallel with each other, a second switch connected in parallel with the first switch and in series with a resistor for producing a voltage drop there across, a combustion sensor for sensing temperature inside the burner, and means for closing the first switch and, upon elapse of a predetermined period of time, opening the first switch and closing the second switch, and for cutting off supply of electric power to the atomizing glow plug and the igniting glow plug when the temperature inside the burned sensed by the combustion sensor has reached a predetermined value.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 3:
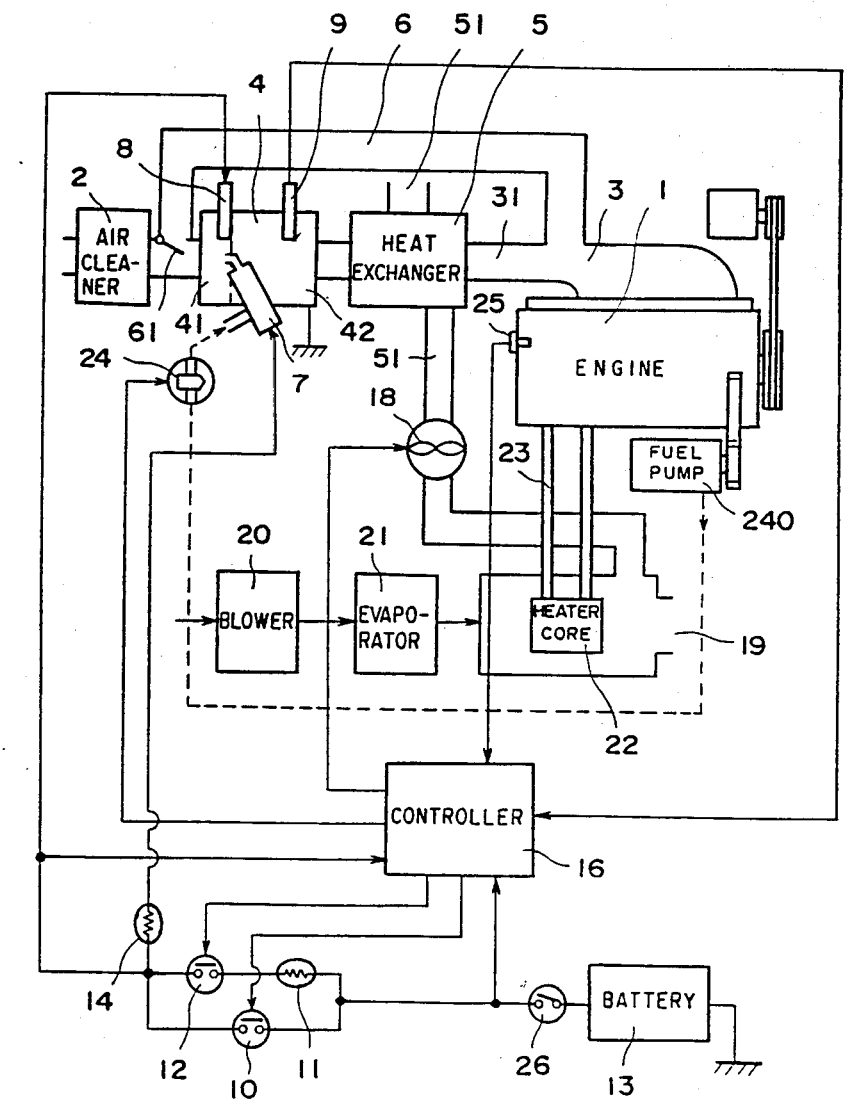
FIG. 3 is a block diagram of a heater system employing the principles of the present invention.

FIG. 3 shows an internal combustion engine 1 having an air intake pipe 3 coupled to an air cleaner 2 through an air duct 31 in which a burner 4 and a heat exchanger 5 are disposed. To the air duct 31, there is connected a bypass passage 6 in bypassing relation to the burner 4 and the heat exchanger 5. A bypass valve 61 is disposed in the inlet end of the bypass passage 6 which is coupled to the air duct 31 upstream of the burner 4. The bypass valve 61 serves to control the rate of flow of air into the burner 4 and the rate of flow of air into the bypass passage 6.

The heat exchanger 5 introduces ambient air from an air inlet 51 and heats the introduced air with the heat of a high-temperature gas produced by burning fuel in the burner 4. The air that has been heated by the heat exchanger 5 is delivered by a blower 18 through a hot-air duct 51 and an air outlet 19 into a passenger compartment to be heated. An air-conditioning unit utilizing a coolant for the internal combustion engine 1 comprises a blower 20, an evaporator 21, and a heater core 22 which is connected to the internal combustion engine 1 by means of coolant pipes 23.

Figure 1:
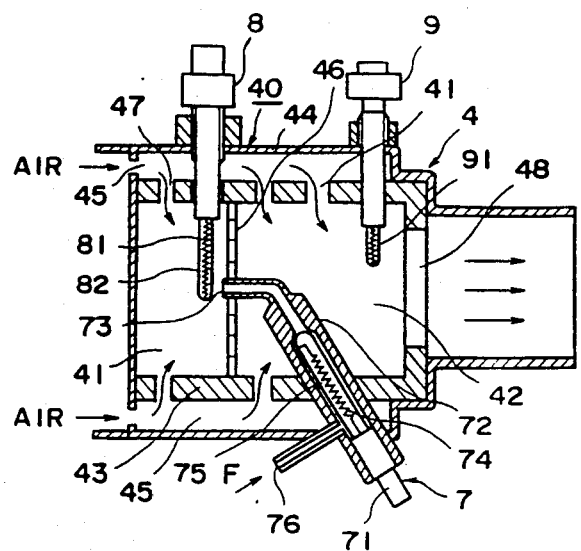
FIG. 1 is a cross-sectional view of a burner employed in a heater according to the present invention.

As shown in FIG. 1, the burner 4 comprises a burner assembly 40, an atomizer 7 for heating and atomizing supplied fuel, an ignition glow plug 8 for igniting the fuel which has been atomized by the atomizer 7, and a combustion sensor 9 for detecting the condition of combustion in the burner 4 and producing a signal representative of the detected condition of combustion.

The burner assembly 40 is constructed of an outer cylinderical tube 44, an inner cylindrical tube 43 disposed concentrically within the outer cylindrical tube 44, and a partition 46 disposed in the inner cylindrical tube 43 and dividing the interior thereof into an ignition chamber 41 and a combustion chamber 42. The inner tube 43 is made of a heat-resistant material such as ceramics or a heat-resistant alloy. The inner tube 43 has a plurality of air inlet holes 47 defined in a peripheral wall thereof for introducing air from an air passage 45 defined between the inner and outer tubes 43, 44. The inner tube 43 also has an outlet passage 48 defined in a righthand end thereof for allowing a combusted gas to be discharged therefrom. The partition 46 is of a honeycomb structure formed of a heat-resistant material such as ceramics for introducing a mixture of atomized fuel and air and a combusted gas from the ignition chamber 41 therethrough into the combustion chamber 42.

The atomizer 7 has a casing 72 extending obliquely from a lower portion of the burner assembly 40 through the outer and inner tubes 44, 43 and partly exposed in the combustion chamber 42, a nozzle 73 joined to the tip end of the casing 72 and extending through the partition 46 and opening into the ignition chamber 41, and an atomizing glow plug 71 disposed in the casing 72. The atomizer 7 is supplied with fuel from a fuel pump 240 (FIG. 3) through a fuel control valve 24 and a fuel inlet 76, and heats the supplied fuel with the atomizing glow plug 71 into atomized fuel, which is ejected from the nozzle 73 into the ignition chamber 41.

The atomizing glow plug 71 and the ignition glow plug 8 will be described in greater detail. The glow plugs 71, 8 have heating elements 75, 82, respectively, made of a ceramics material, for example, with resistance wires 74, 81 of a positive temperature coefficient embedded respectively therein. When an electric current from a suitable power supply is passed through the resistance wires 74, 81, the atomizing glow plug 71 is heated up to a fuel atomizing temperature such as about 500° C., for example, and the ignition glow plug 8 is heated up to a fuel igniting temperature such as about 900° C., for example. Since the resistance wires 74, 81 are heated to different temperatures and have different heat capacities and configurations, their resistances are also different from each other, but the resistance wires should preferably have the same rated voltage. If their rated voltages differ from each other, an adjusting resistor (described later) may be used.

The combustion sensor 9 has a detector made of a ceramics material with a temperature sensor wire 91 embedded therein. The combustion sensor 9 thus serves as a means for detecting the condition of fuel combustion in the combustion chamber 42 by way of a change in the resistance of the temperature sensor wire 91.

Figure 2:
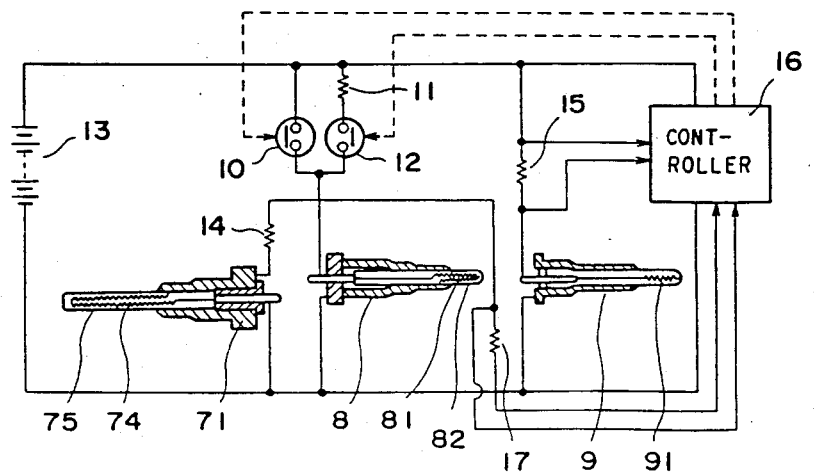
FIG. 2 is a circuit diagram of a control circuit for the burner.

In FIG. 2, the resistance wire 74 of the atomizing glow plug 71 and the resistance wire 81 of the ignition glow plug 8 are connected parallel to each other, and also to a circuit having an A switch 10 serving as a first switch and a B switch 12 serving as a second switch and connected in series to a resistor 11. The A switch 10 and the B switch 12 are connected parallel to each other. A voltage is applied by a battery 13 through the A and B switches 10, 12 to the resistance wires 74, 81. The resistor 11 connected in series to the B switch 12 serves to cause a voltage drop thereacross. A resistor 14 connected in series to the resistance wire 74 of the atomizing glow plug 71 serves as an adjusting resistor for matching the resistance wire 74 with the voltage supplied by the battery 13. If the rated voltage of the resistance wire 74 matches the supplied voltage, then the resistor 14 is dispensed with.

A temperature detecting resistor 15 is connected in series with the temperature sensor wire 91 of the combustion sensor 9, and detects a change in the resistance of the temperature sensor wire 91 which varies with the temperature in the combustion chamber 42. The temperature detecting resistor 15 applies a signal representative of the detected temperature change to a controller 16. A voltage detecting resistor 17 detects a voltage imposed on the atomizing glow plug 71 and the ignition glow plug 8 and transmits a signal indicative of the detected voltage to the controller 16.

The controller 16 is in the form of a microcomputer and has a program-implemented timer (hereinafter referred to as a "timer"). The controller 16 is energized by the battery 13 and responds to a signal from the combustion sensor 9, indicative of the temperature in the combustion chamber 42, and a voltage signal from the voltage detecting resistor 17, for opening and closing the A and B switches 10, 12 to control the supply of electric power to the atomizing glow plug 71 and the ignition glow plug 8. The controller 16 also controls the blower 18 and the fuel control valve 24 based on a signal from a coolant temperature sensor 25 which detects the temperature of the coolant in the internal combustion engine 1.

A power supply switch 26 in FIG. 3 supplies electric power from the battery 13 to the controller 16 and the glow plugs 71,8.

Operation of the heater controller thus constructed will be described below.

When the power supply switch 26 is turned on to energize the controller 16, the B switch 12 remains turned off under the control of the timer, but the A switch 10 is turned on to supply an electric current from the battery 13 to the atomizing glow plug 71 and the ignition glow plug 8 to heat the respective resistance wires 74, 81. Upon elapse of a predetermined period of time (t seconds), the glow plugs 71, 8 are heated up to respective prescribed temperatures.

Upon energization of the controller 16, the fuel control valve 24 is opened to supply fuel from the fuel tank 240 to the atomizer 7 through the fuel inlet 76. The supplied fuel is atomized in the atomizer 7, which has been heated to the desired temperature, and the atomized fuel is then ejected by the nozzle 73 into the ignition chamber 41.

In the ignition chamber 41, the ejected atomized fuel and air from the air inlet holes 47 are mixed into a combustible air-fuel mixture which is then brought into contact with the ignition glow plug 8 that has reached the ignition temperature. The air-fuel mixture is now combusted to produce flames and flows through the honeycomb grid-like passageways of the partition 46 into the combustion chamber 42. The combusted mixture is further mixed with air from the air inlet holes 47 into a high-temperature combustion gas, which passes through the outlet passage 48 of the combustion chamber 42 into the heat exchanger 5 located downstream of the burner 4. During this time, the temperature sensor wire 91 of the combustion sensor 9 and the outer wall surface of the casing 72 of the atomizer 7 are heated by the high-temperature combustion gas in the combustion chamber 42, for thereby heating fuel which is continuously supplied from the fuel inlet 76.

Upon elapse of the prescribed time (t seconds) after the A switch 10 has been turned on, the controller 16 turns off the A switch 10 and turns on the B switch 12 to pass a current through the resistor 11 to the glow plugs 71, 8. Since the glow plugs 71, 8 have already reached the respective temperatures by being heated by the current supplied via the A switch 10, their temperatures can well be maintained even by the current supplied via the resistor 11, preventing the heater elements 75, 82 from being overheated. When the sufficient combustion condition is reached in the combustion chamber 42, a change in the resistance of the temperature sensor wire 91 of the combustion sensor 9 is transmitted to the controller 16, which then turns off the A and B switches 10, 11. Even under this condition, the atomizer 7 is kept at the fuel atomizing temperature by the high-temperature combustion gas in the combustion chamber 42. Furthermore, inasmuch as flames are continuously produced in the combustion chamber 42 on account of continued combustion, the glow plugs 71, 8 are no longer required to be energized.

When the desired combustion condition in the combustion chamber 42 fails to be accomplished for some reason, a corresponding change in the resistance of the temperature sensor wire 91 is transmitted to the controller 16. The controller 16 then turns on the A switch 10 or the B switch 12 to energize the glow plugs 71, 8 for attaining the sufficient combustion condition in the combustion chamber 42.

The controller 16 also detects the voltage across the voltage detecting resistor 17. If the voltage applied to the glow plugs 71, 8 is too low, the controller 16 increases the timer operating time so as to be longer than the prescribed time (t seconds). Conversely, if the voltage applied to the glow plugs 71, 8 is too high, the controller 16 reduces the timer operating time. Therefore, the controller 16 controls the time interval between the time when the A switch 10 is turned on and the time when the B switch 12 is turned on.

As described above, the high-temperature combustion gas produced by the fuel combustion in the burner 4 flows through the outlet passage 48 into the heat exchanger 5. In the heat exchanger 5, ambient air introduced through the air inlet 51 is heated by the supplied high-temperature combustion gas and discharged by the blower 18 as hot air, so that the heating of the compartment can be started immediately after the power supply switch 26 is turned on. The combustion gas that has passed through the heat exchanger 5 is introduced via the air intake pipe 3 into the internal combustion engine 1 for assisting the engine 1 in getting started quickly, which is especially useful in cold weather.

When the temperature of the coolant is increased to the extent that the coolant can be used for heating the compartment, upon elapse of a certain time after the internal combustion engine 1 has started its operation, the coolant sensor 25 applies a signal to the controller 16, which now closes the fuel control valve 24 and de-energizes the blower 18 to stop the heating of the compartment by the burner 4. At the same time, the controller 16 actuates the blower 20 and the heater core 22 of the air-conditioning unit for heating the compartment with the heat of the coolant.

With the arrangement of the present invention, as described above, the atomizing glow plug for atomizing fuel in the heater and the ignition glow plug for igniting the atomized fuel are connected parallel to each other, and the A switch for supplying an electric current from the power supply and the B switch to which a resistor is connected in series are connected parallel to each other. The A switch is first turned on to heat the glow plugs quickly up to respective temperatures desired for them to atomize and ignite the fuel. A timer is set to a time period which is required for the desired temperatures to be reached by the glow plugs. When the timer runs out, the A switch is turned off and the B switch is turned on to continue fuel combustion. If a sufficient combustion condition is detected by the combustion sensor, then the glow plugs are de-energized. Thus, the mechanism for energizing the glow plugs of the heater can be controlled easily, and hence the cost of components used for controlling purpose is reduced and the controlling mechanism is improved in reliability.

Since the timer operating time is controlled by the magnitude of the voltage applied to the glow plugs, the temperatures of the glow plugs can appropriately be increased up to desired temperatures.

The B switch 12 may be a normally closed switch which can be turned off by a signal from the combustion sensor 9.

Although a certain preferred embodiment has been shown and described, it should be understood that many changes and modifications may be made therein without departing from the scope of the appended claims.

What we claim is:

1. A controller for controlling a heater including a burner having an atomizing glow plug for heating and atomizing fuel and an igniting glow plug for igniting the fuel which has been heated and atomized by the atomizing glow plug, said controller comprising:
    a first switch for supplying electric power to said atomizing glow plug and said igniting glow plug which are connected in parallel with each other;
    a second switch connected in parallel with said first switch and in series with a resistor for producing a voltage drop there across;
    a combustion sensor for sensing temperature inside said burner; and
    means for closing said first switch and, upon elapse of a predetermined period of time, opening said first switch and closing said second switch, and for cutting off supply of electric power to said atomizing glow plug and said igniting glow plug when the temperature inside said burner sensed by said combustion sensor has reached a predetermined value.

2. A controller according to claim 1, further including means for detecting a voltage applied to said atomizing and ignition glow plugs to control said predetermined period of time.

3. A controller according to claim 1, wherein said atomizing glow plug is connected to said first and second switches through an adjusting resistor.

4. A controller according to claim 1, wherein said atomizing glow plug has a heating element made of a ceramics material with a resistance wire of a positive temperature coefficient embedded therein.

5. A controller according to claim 1, wherein said ignition glow plug has a heating element made of a ceramics material with a resistance wire of a positive temperature coefficient embedded therein.

* * * * *